UNITED STATES PATENT OFFICE.

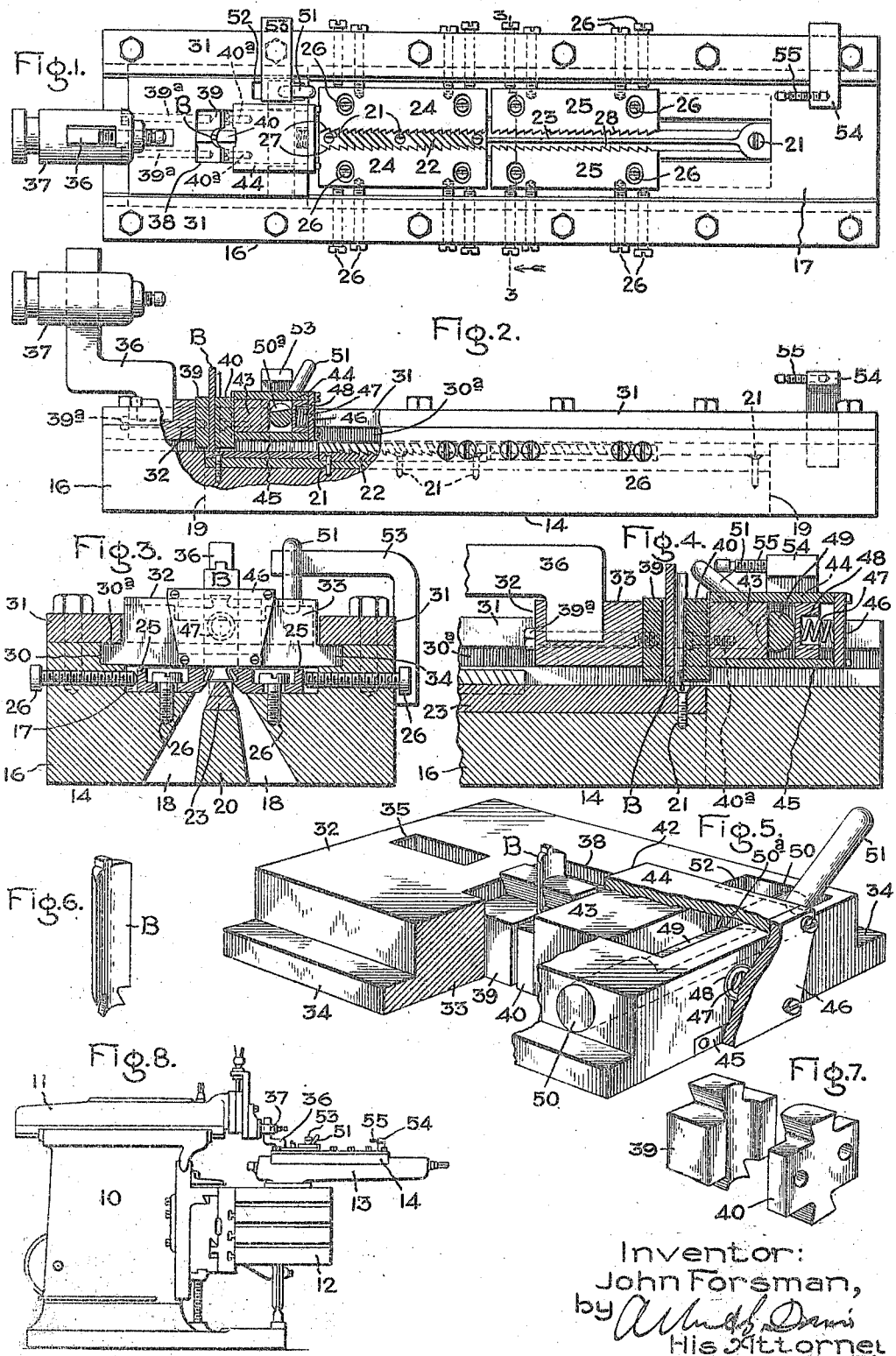

JOHN FORSMAN, OF QUINCY, MASSACHUSETTS, ASSIGNOR TO GENERAL ELECTRIC CO., A CORPORATION OF NEW YORK.

SHAPER-FIXTURE FOR BROACHING DOVETAIL ENDS OF TURBINE-BUCKETS AND THE LIKE.

1,254,589.  Specification of Letters Patent.  Patented Jan. 22, 1918.

Application filed January 21, 1916. Serial No. 73,405.

*To all whom it may concern:*

Be it known that I, JOHN FORSMAN, a citizen of the United States, residing at Quincy, in the county of Norfolk, State of Massachusetts, have invented certain new and useful Improvements in Shaper-Fixtures for Broaching Dovetail Ends of Turbine-Buckets and the like, of which the following is a specification.

The present invention relates to shaper fixtures, and has for its object to provide an improved fixture for use in connection with an ordinary shaper, and particularly intended for cutting the slots in the base of turbine buckets, thereby forming the dovetail base thereof, and also for finishing the bottoms of the buckets. It will be understood, however, that the invention is not necessarily limited to this particular use.

For a consideration of what I believe to be novel and my invention, attention is directed to the accompanying specification and the claims appended thereto.

In the accompanying drawing, wherein I have illustrated an embodiment of my invention, Figure 1 is a top plan view of the fixture; Fig. 2 is a side elevation partly in section of the fixture; Fig. 3 is a section taken on line 3—3, Fig. 1; Fig. 4 is a central vertical section of a portion of the fixture; Fig. 5 is a detail perspective view partly broken away of the reciprocating carrier of the fixture; Fig. 6 is a perspective view of a finished turbine bucket; Fig. 7 is a detail perspective view of the clamping members for the buckets; and Fig. 8 is a side elevation of a shaper with my improved fixture in place thereon.

Referring to the drawing, Fig. 8, 10 indicates the bed, 11 the sliding head, and 12 the table of a shaper, it being understood that the shaper is provided with a suitable power driven mechanism for reciprocating the head, as is well known. Mounted on the table 12 is a holder 13 in which the fixture 14 is secured, it being clamped in place therein in any suitable manner.

Referring now to the other views of the drawing, the fixture comprises a rectangular stationary member 16 having a longitudinally extending channel 17 which extends throughout its length. The bottom of the stationary member 16 is provided with two slots 18 which extend the greater portion of its length, the dotted lines 19, Fig. 2, best indicating the extent of these slots. Between the two slots is the longitudinally extending web 20, the top surface of which is cut down lower than the adjacent surface of the channel 17 and upon which is fixed by suitable screws 21 a part comprising a broaching section 22 having teeth on its top surface and a supporting section 23. Fixed on the bottom of channel 17 on opposite sides of the web 20 are two sets of broaching tools 24 and 25. Each set comprises two parts held in place by suitable screws or bolts 26 as shown, the same being suitably arranged so that the tools can be adjusted to the correct positions. The set 24 has cutting teeth 27 and is arranged over and on opposite sides of the cutting section 22; the set 25 has cutting teeth 28, and is arranged adjacent the supporting section 23. The space between the members of each set of broaching tools 24 and 25 tapers from the left-hand end to the right-hand end, and the arrangement is such that when an unfinished turbine bucket is passed through the space between the broaching tools from the left-hand end to the right-hand end, the teeth of cutting section 22 will finish the bottom of the bucket, and the teeth of the cutting tools 24 and 25 will cut the dovetail therein. The broaching tools are formed with a number of teeth, each cutting off a small amount so as to avoid forming burs on the edges. The upper side walls of the channel 17 are cut back to form ledges 30 over which are bolted the plates 31, thus providing grooves 30ª in which a reciprocating carrier 32 for carrying the part upon which work is to be performed, *i. e.*, the turbine bucket, slides. The carrier 32 is shown in perspective in Fig. 5. It comprises a rectangular block 33 having flanges 34 on its two sides which rest on the ledges 30 and slide in grooves 30ª. The block has an opening 35 to receive the end of a bar 36 which is carried by the tool holder 37 of the sliding head 11 of the shaper, by which it is reciprocated. The block 33 also has a rectangular opening 38 in which is arranged a pair of clamping members 39 and 40. These are shown in detail perspective in Fig. 7. The clamping member 39 is fixed to the block 33 at one end of the opening 38, as by bolts 39ª (Figs. 1, 2, and 4) and the clamping member 40 is fixed to a sliding rectangular frame 42, as by bolts 40ª. The frame 42 comprises an inner end wall 43 which is located in opening 38 and to which the clamping member 40 is fixed, a top wall 44, a bottom wall 45, and an outer end wall 46 which is located outside the block 33. The top wall 44 is wider than the end wall 43 and rectangular opening 38 to form ledges which slide on top of the block 33, and the bottom wall 45 is arranged in a recess in the lower side of the block 33 so that its lower face is flush with that of said block. The frame can thus slide on the block 33 to move the clamping member 40 toward and away from the clamping member 39. The frame 42 is biased to a position in which the clamping member 40 is separated from clamping member 39 by a spring 47 located in a recess 48 in the end of carrier 32 and bearing against the inner face of the end wall 46, and it is adapted to be moved in the opposite direction against the action of the spring by a cam 49. This cam comprises a round bar 50, journaled in the block 33 and extending across the end of opening 38 and within the frame 42. In the bar is a recess or slot 50ª of the same width as the inner end wall 43 of the sliding frame and into which such wall may be moved by the spring 47. Fixed to the bar for turning it is an operating handle 51 which extends through a slot 52 in the block 33. The handle is turned automatically in the two extreme positions of the reciprocating carrier 32 by means of being brought into engagement at the one end of its movement with an L-shaped stop 53 fixed on the stationary member 16, and at the other end of its movement with an adjustable stop also fixed to the stationary member 16, and comprising an L-shaped member 54 which may, if desired, be adjustable on the stationary member 16 and which carries an adjustable threaded bolt 55 for engagement with the handle 51.

The operation is as follows: Referring to Figs. 1 and 2, the carrier 32 has reached the extreme end of its movement to the left, the handle 51 has engaged stop 53 and turned the bar 50, causing it to act as a cam to force the frame 42 to the left and clamp the turbine bucket B between the clamping members 39 and 40. The shaper head 11 now moves toward the right, forcing the carrier 32 along with it. This carries the base of the bucket along between the broaching tools 24 and 25, and in its passage the bottom of the bucket is finished by cutting section 22 and the dovetail is formed by the tools 24 and 25. As the carrier 32 approaches the extreme of its movement to the right, the cutting operation is completed and the handle 51 engages stop 55, thus turning bar 50 and bringing the slot or recess 50ª into line with the end wall 43 of frame 42. The spring 47 then moves the frame 42 to the right, moving the clamping member 40 away from the clamping member 39 and thus releasing the bucket. The position of the parts at such time is shown in Fig. 4, where it will be seen that the inner end wall 43 of frame 42 has moved into slot 50ª in the bar 50. The operator then removes the finished bucket. At the same time, the direction of movement of carrier 32 is reversed and it begins its movement toward the left, which is the idle stroke. As soon as the carrier reaches a position where the space between the clamping members 39 and 40 is at least over the cutting tools 25, an unfinished bucket is dropped into such space. Since the base of the unfinished bucket is wider than the space between the cutting tools 24 and 25, it will engage the top of them and slide along thereon until it passes beyond the left-hand end of tools 24, when it will drop down to the position shown in Fig. 2. The handle 51 then engages stop 53, thus turning bar 50 and clamping the unfinished bucket between the clamping members 39 and 40. The cycle of operation is then repeated.

While the operator is removing a finished bucket and preparing to insert an unfinished one, the direction of movement of the carrier will have become reversed and it will have started on its return movement, so that by the time the operator is ready to insert the unfinished bucket, the space between the two clamping members 39 and 40 will already be over the cutting tools. The supporting section 23 serves to support the bucket after it is unclamped and thus prevent it from dropping down. The slots 18 serve as a passage for the escape of the material cut from the buckets.

Fig. 6 shows a finished bucket. It will be understood that prior to the cutting operation the bucket is of uniform section throughout its length. This is shown in Fig. 2.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means within the scope of the appended claims.

What I claim as new, and desire to secure by Letters Patent of the United States, is:—

1. The combination with a shaper having a sliding head and a supporting table, of a fixture carried by the table comprising a stationary member, cutting tools fixed thereon, a carrier slidable on the stationary member, clamping members on the carrier for clamping the part upon which work is to be performed, means controlled by the movement of the carrier for automatically closing said clamping members, and means connecting the carrier to the sliding head of the shaper.

2. The combination with a shaper having a sliding head and a supporting table, of a fixture carried by the table comprising a stationary member, cutting tools fixed thereon, a carrier slidable on the stationary member, clamping members on the carrier for clamping the part upon which work is to be performed, means controlled by the movement of the carrier for automatically releasing said clamping members, and means connecting the carrier to the sliding head of the shaper.

3. The combination with a shaper having a sliding head and a supporting table, of a fixture carried by the table comprising a stationary member, cutting tools fixed thereon, a carrier slidable on the stationary member, clamping members on the carrier for clamping the part upon which work is to be performed, means controlled by the movements of the carrier for automatically closing and releasing said clamping members, and means connecting the carrier to the sliding head of the shaper.

4. The combination with a shaper having a sliding head and a supporting table, of a fixture carried by the table comprising a stationary member, cutting tools fixed thereon, a carrier slidable on the stationary member, clamping members on the carrier for clamping the part upon which work is to be performed, one of said clamping members being fixed to the carrier, a frame movable on the carrier to which the other clamping member is secured, means controlled by the movements of the carrier for automatically moving said frame to close and release the clamping members, and means connecting the carrier to the sliding head of the shaper.

5. In an apparatus of the character described, the combination of a stationary member, cutting tools fixed thereon, a carrier slidable on the stationary member having an opening therein, clamping members on the carrier, one of them being fixed to the carrier in said opening, a frame slidable on the carrier and partially located in said opening, the other clamping member being fixed to said frame within the opening, and means controlled by the movement of the carrier for moving the frame on the carrier to bring the clamping members into and out of clamping position.

6. The combination with a shaper having a sliding head and a supporting table, of a fixture carried by the table comprising a stationary member, cutting tools fixed thereon, a carrier slidable on the stationary member and having an opening therein, clamping members on the carrier, one of them being fixed to the carrier in said opening, a frame slidable on the carrier and having a part located in the opening, the other clamping member being fixed to said frame within the opening, a cam on the carrier for moving the frame to bring the clamping member into closed position, a spring for moving the frame to bring the clamping members into release position, means for automatically moving the cam, and means connecting the carrier to the sliding head of the shaper.

In witness whereof, I have hereunto set my hand this seventeenth day of January, 1916.

JOHN FORSMAN.